(12) United States Patent
Beevers

(10) Patent No.: US 9,779,113 B2
(45) Date of Patent: Oct. 3, 2017

(54) SYSTEMS AND METHODS FOR IMPROVING DOMAIN NAME SYSTEM TRAFFIC ROUTING

(71) Applicant: NSONE Inc., New York, NY (US)

(72) Inventor: Kristopher Beevers, New York, NY (US)

(73) Assignee: NSONE INC., New York, NY (US)

(*) Notice: Subject to any disclaimer, the term of this patent is extended or adjusted under 35 U.S.C. 154(b) by 163 days.

(21) Appl. No.: 14/661,201

(22) Filed: Mar. 18, 2015

(65) Prior Publication Data

US 2015/0271031 A1 Sep. 24, 2015

Related U.S. Application Data

(60) Provisional application No. 61/955,941, filed on Mar. 20, 2014.

(51) Int. Cl.
*G06F 17/30* (2006.01)
*H04L 29/12* (2006.01)
*H04L 12/26* (2006.01)

(52) U.S. Cl.
CPC ........ *G06F 17/30241* (2013.01); *H04L 43/08* (2013.01); *H04L 61/1511* (2013.01);
(Continued)

(58) Field of Classification Search
CPC ........................... G06F 17/30241; H04L 43/08
(Continued)

(56) References Cited

U.S. PATENT DOCUMENTS 7,631,101 B2 * 12/2009 Sullivan ............ H04L 29/12066
709/203
8,200,696 B2 * 6/2012 Keohane ........... G06F 17/30887
707/781
(Continued)

OTHER PUBLICATIONS

Frost, "What Is the Difference between Authoritative and Recursive DNS Nameservers?", 2014.*
(Continued)

*Primary Examiner* — O. C. Vostal
(74) *Attorney, Agent, or Firm* — Norris McLaughlin & Marcus, P.A.

(57) ABSTRACT

Systems and methods for improving Domain Name System (DNS) traffic routing, the systems and methods have a DNS resolver in digital communication with a microprocessor of an authoritative DNS server, wherein the authoritative DNS server is configured to make DNS traffic routing decisions, wherein a DNS query, associated with a requested DNS resource record, is transmitted to the authoritative DNS server. The systems and methods have at least one database in digital communication with, and accessible by, the authoritative DNS server, wherein the authoritative DNS server identifies the requested DNS resource record associated with the DNS query and extracts, from the at least one database, one or more configuration details associated with the requested DNS resource record, wherein the one or more configuration details associated comprise at least an input collection of potential answers to the DNS query and at least one assigned filter instruction. The microprocessor filters the input collection of potential answers by executing the at least one filter instruction to extract a final output from the input collection of potential answers, wherein the final output comprises at least one final answer to the DNS query. The at least one final answer is composed into a DNS response to the DNS query by the microprocessor, and the
(Continued)

DNS response may be is returnable as output to the DNS resolver.

17 Claims, 2 Drawing Sheets

(52) U.S. Cl.
CPC ........ *H04L 43/087* (2013.01); *H04L 43/0829* (2013.01); *H04L 43/0888* (2013.01)

(58) Field of Classification Search
USPC .......................................................... 709/224
See application file for complete search history.

(56) References Cited

U.S. PATENT DOCUMENTS

| | | | |
|---|---|---|---|
| 8,527,639 B1* | 9/2013 | Liskov | H04L 67/1021 709/203 |
| 9,032,092 B1* | 5/2015 | Sinn | H04L 61/00 709/222 |
| 9,313,205 B2* | 4/2016 | Martini | H04L 63/101 |
| 9,450,840 B2* | 9/2016 | Denis | H04L 43/04 |
| 2003/0055954 A1* | 3/2003 | Kavanagh | H04L 29/12066 709/224 |
| 2005/0015644 A1* | 1/2005 | Chu | H04L 69/329 714/4.1 |
| 2006/0013158 A1* | 1/2006 | Ahuja | H04L 12/4641 370/328 |
| 2006/0165060 A1* | 7/2006 | Dua | G06Q 20/20 370/352 |
| 2006/0173977 A1* | 8/2006 | Ho | H04L 29/12009 709/220 |
| 2006/0184640 A1* | 8/2006 | Hatch | G06F 17/3087 709/217 |
| 2007/0038755 A1* | 2/2007 | Sullivan | G06F 17/30876 709/226 |
| 2008/0086574 A1* | 4/2008 | Raciborski | H04L 29/12066 709/245 |
| 2008/0201413 A1* | 8/2008 | Sullivan | H04L 29/12066 709/203 |
| 2010/0125675 A1* | 5/2010 | Richardson | H04L 29/12066 709/242 |
| 2010/0274970 A1* | 10/2010 | Treuhaft | H04L 29/12066 711/118 |
| 2011/0078309 A1* | 3/2011 | Bloch | H04L 12/2602 709/224 |
| 2012/0131192 A1* | 5/2012 | MacCarthaigh | H04L 29/08288 709/226 |
| 2012/0158969 A1* | 6/2012 | Dempsky | H04L 61/6013 709/226 |
| 2012/0166483 A1* | 6/2012 | Choudhary | G06F 17/30545 707/770 |
| 2012/0254996 A1* | 10/2012 | Wilbourn | H04L 61/1511 726/22 |
| 2013/0121298 A1* | 5/2013 | Rune | H04L 29/12066 370/329 |
| 2015/0188949 A1* | 7/2015 | Mahaffey | H04L 63/20 726/1 |
| 2016/0007191 A1* | 1/2016 | Perras | H04L 61/1511 370/328 |
| 2016/0036816 A1* | 2/2016 | Srinivasan | H04L 63/10 726/1 |

OTHER PUBLICATIONS

Microsoft Computer Dictionary, "authority", 5$^{th}$ edition, 2002, p. 43.*
Microsoft Computer Dictinary, "IP address", 5ht edition, 2002, p. 287.*
Edeki et al., "Object Oriented Applications: Integration, Quality Assurance, and Deployment", 2015.*
Julkunen, "Enhanced Network Security by a Dynamic Packet Filter", 1994.*

* cited by examiner

SYSTEMS AND METHODS FOR IMPROVING DOMAIN NAME SYSTEM TRAFFIC ROUTING

CROSS REFERENCE TO RELATED APPLICATION

This application is a non-provisional application claiming the benefit under 35 U.S.C. 119(e) of U.S. Provisional Patent Application No. 61/955,941, filed on Mar. 20, 2014, which is incorporated herein by reference in its entirety.

FIELD OF THE DISCLOSURE

The present systems and methods relates to determining, calculating and/or identifying traffic routing decisions in and/or by an authoritative Domain Name System (hereinafter "DNS") server based on one or more configuration inputs, real time network and systems data, application specific data, user specific data, and/or data contained within DNS packets. The present systems and methods may execute one or more computer-implemented steps that may filter potential answers of a DNS query to determine, calculate and/or identify one or more final answers to the DNS query. The one or more steps executed by the present systems and methods may be one or more filter instructions and/or algorithms which may be executed subsequently with respect to each other by one or more processors associated with the DNS server.

BACKGROUND

The DNS is the core Internet system responsible for mapping domain names, such as, for example, www.example.com, to service related details such as internet protocol (hereinafter "IP") addresses, email servers, internet-accessible resources and the like. An authoritative DNS server or service is a DNS system with definitive information about specific domain names and/or DNS records. The authoritative DNS server is queried by users or intermediary servers to obtain service details for the domain names for which it is authoritative.

Historically, authoritative DNS servers respond to DNS queries by doing lookups and/or inquiries in a simple, static database mapping domain names and record types to service details. For example, the canonical BIND name server software, produced by the Internet Systems Consortium, uses "zone files" encoding DNS record details for records in a DNS "zone," such as, for example, domain and/or subdomain.

More recently, some DNS server software, or managed DNS service providers with proprietary software, have added capabilities for computing answers to DNS queries dynamically, instead of performing a simple lookup in a static database to determine the answer to a query, these software and/or systems may gather a collection of possible answers from a database or other source of input. Based upon configuration details and other inputs, such as, for example, the IP address of the requester or system status details of backend services or servers, the system selects one or more answers dynamically to determine the response to the query. Such software or systems generally provide a small set of predefined approaches for computing dynamic answers to a DNS query based on limited, mostly static inputs.

SUMMARY OF DISCLOSURE

The present systems and methods provide a filter chain mechanism for making dynamic decisions about how to answer a DNS query. The present systems and methods provide novel techniques and tools allowing users or resource owners to configure application-specific approaches for computing, filtering, determining and/or identifying dynamic answers, using a library of predefined filter instructions that can be selected, configured, arranged and/or combined into a complex sequence. The present systems and methods comprise a system architecture for configuring and executing a sequential "filter chain" approach to determine, calculate and/or identify a final response or final responses to the DNS query. Such sequential "filter chain" approach is a novel technique to dynamically resolve a DNS query and selects one or more suitable or final answers from a collection of many potential answers by using a pre-configured arrangement of built-in and/or predefined filter chain mechanism and/or one or more filter chain instructions, steps and/or algorithms (hereinafter "filter chain instructions").

BRIEF DESCRIPTION OF THE DRAWINGS

So that the features and advantages of the present disclosure can be understood in detail, a more particular description of the present systems and methods may be had by reference to the embodiments thereof that are illustrated in the appended drawings. It is to be noted, however, that the appended drawings illustrate only some embodiments of the present systems and methods and are therefore not to be considered limiting of its scope, for the systems and methods may admit to other equally effective embodiments.

DETAILED DESCRIPTION OF THE DISCLOSURE

The present systems and methods improve DNS traffic routing by executing a filter chain mechanism, comprising at least one filter chain instruction, to determine, compute and/or identify one or more final answers to a DNS query, wherein the DNS query is received from a client terminal, from among a selection and/or collection of potential answers to the DNS query. The filter chain mechanism comprises one or more filter instructions, steps and/or algorithms (hereinafter "filter instructions") that may be executed sequentially to filter, determine, compute and/or identify the one or more final answers to the DNS query which may be subsequently transmitted to the client terminal and/or DNS resolver.

Figure 1:
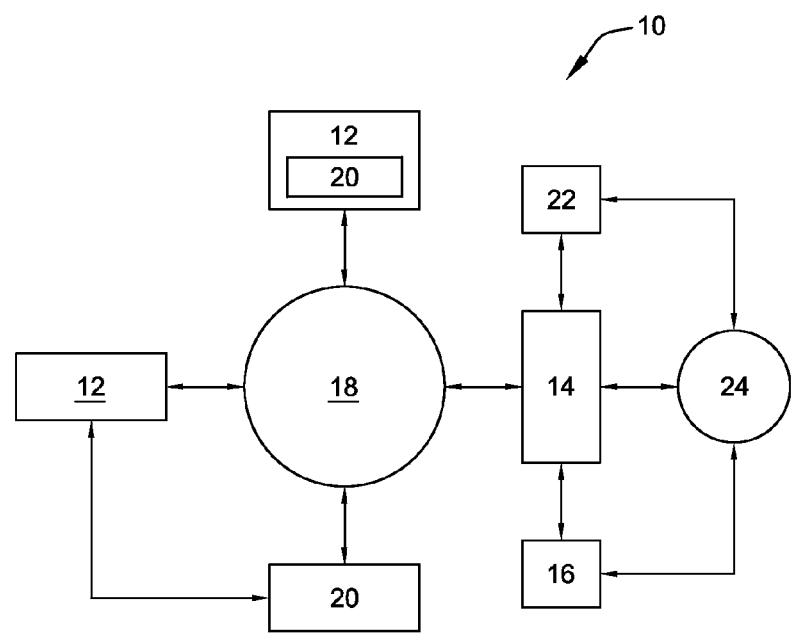
FIG. 1 illustrates a block diagram of a DNS system for improving DNS traffic routing in an embodiment.

Referring now to the drawings wherein like numerals refer to like parts, FIG. 1 shows a DNS system 10 (hereinafter "system 10") for improving DNS traffic routing, whereby the system 10 comprises at least one client terminal 12 (hereinafter "terminal 12"), at least one authoritative DNS server 14 (hereinafter "DNS server 14"), at least one digital storage device, memory and/or database 16 (hereinafter "database 16"), at least one first digital communication network 18 (hereinafter "first network 18"), at least one DNS resolver 20 (hereinafter "DNS resolver 20"), at least one user interface 22 (hereinafter "interface 22"), at least one second digital communication network 24 (hereinafter "second network 24") and/or any combination thereof. The DNS server 14 is specifically configured, adapted and/or programmed to make DNS traffic routing decisions and/or to translate domain names into numerical IP addresses.

The present disclosure should not be deemed as limited to a specific number of client terminals, DNS servers, databases, communication networks, DNS resolvers and user interfaces which may access and/or may utilize the system 10 for improving DNS traffic routing. The present systems and methods may include and/or incorporate any number of client terminals, DNS servers, databases, communication networks, DNS resolvers and user interfaces as known to one of ordinary skill in the art.

In embodiments, the terminal 12 may be one or more portable digital devices, one or more handheld digital devices, one or more computer terminals or any combination thereof. In embodiments, the terminal 12 may be a wired terminal, a wireless terminal or any combination thereof. For example, the terminal 12 may be wireless electronic media device, such as, for example, a tablet personal computer (hereinafter "PC"), an ultra-mobile PC, a mobile-based pocket PC, an electronic book computer, a laptop computer, a video game console, a digital projector, a digital television, a digital radio, a media player, a portable media device, a PDA, an enterprise digital assistant and/or the like. In other embodiments, the terminal 12 may be, for example, a hyper local digital device, a location-based digital device, a GPS-based digital device, a mobile device (i.e., a 4G mobile device, a 3G mobile device or the like), an ALL-IP electronic device, an information appliance or a personal communicator. The present disclosure should not be deemed as limited to a specific embodiment of the terminal 12.

The terminal 12 may have at least one display for displaying or rendering information and/or multimedia data stored in a memory or at least one digital storage device accessible by a microprocessor (not shown in the drawings) of the terminal 12, stream to the terminal 12 via the first network 18 or a combination thereof. In an embodiment, the display of the terminal 12 may be a touch-screen graphic user interface (hereinafter "GUI") or a digitized screen connected to the microprocessor of the terminal. The terminal 12 may display or render selected information and/or the multimedia data to the user associated with the final answer or answers of the DNS query. The selected information and/or multimedia data may include one or more web sites, one or more web applications, one or more web pages, digital media, IP addresses, e-mail servers and/or the like that may be accessible via the system 10.

In embodiments, the terminal 12 may have one or more communication components for connecting to and/or communicating with the first network 18. In an embodiment, the one or more communication components of the terminal 12 may be a wireless transducer, such as, for example, a wireless sensor network device, such as, for example, a Wi-Fi network device, a wireless ZigBee device, an EnOcean device, an ultra-wideband device, a wireless Bluetooth device, a wireless Local Area Network (hereinafter LAN) accessing device, a wireless IrDA device and/or the like.

The terminal 12 may connect to and/or may access the first network 18 via the one or more communication components of the terminal 12. In an embodiment, the terminal 12 may be connected to and/or in digital communication with the DNS resolver 20 via the first network 18. In another embodiment, terminal 12 may be directly connected to and/or in direct digital communication with the DNS resolver 20. In yet another embodiment, the DNS resolver 20 may be integrated into, or part of, the terminal 12. In embodiments, the DNS resolver 20 may be an internet and/or intermediary DNS resolver specifically assigned to the terminal 12 and/or provided by an internet service provider of, or associated with, the terminal 12.

The terminal 12, the DNS server 14 and/or the DNS resolver 20 may be connected to and/or accessible via the first network 18 of the system 10. As a result, the terminal 12 and/or the DNS resolver 20 may be in digital communication with the DNS server 14 and may access at least one internet-accessible resource (hereinafter "internet-accessible resource") via the first network 18, wherein the internet-accessible resource comprises at least one web site, at least one web page, at least one web application, at least one mobile application, at least one e-mail server, digital information, digital data, digital media content and/or combination thereof.

In embodiments, the DNS server 14 may be directly connected and/or in direct communication with the database 16 and/or the interface 22. In another embodiment, the DNS server 14 may be connected to the database 16 and/or the interface 22 via the second network 24. The database 16 may be a memory or storage medium that is local with respect to the DNS server 14 or may located remotely with respect to the DNS server 14 whereby "remotely" means positioned at a different location than the DNS server 14. Similar to the database 16, the interface 22 may be located locally or remotely with respect to the DNS server 14. In an embodiment, the system 10 and/or the database 16 may comprise one or more additional DNS systems and/or may be distributed across multiple servers or datacenters (not shown in the drawings). In embodiments, the interface 22 may comprise a programmatic Application Programming Interface (hereinafter "API"), a GUI and/or the like.

Figure 2:
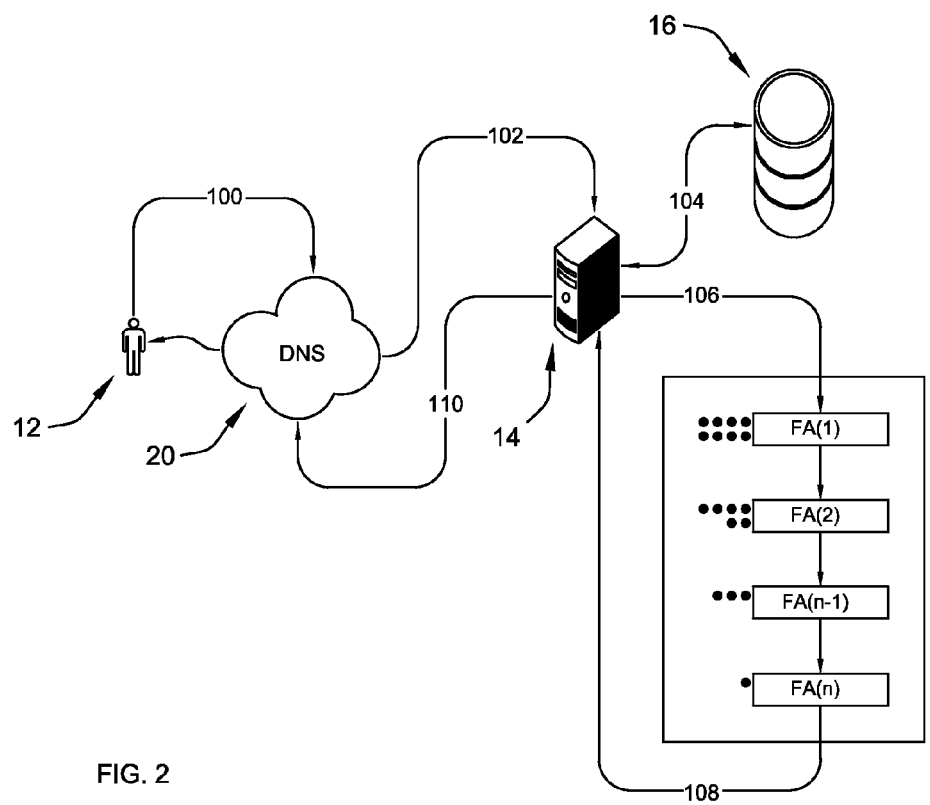
FIG. 2 illustrates a block diagram of a computer-implemented method for resolving a DNS query in an embodiment.
Figure 3:
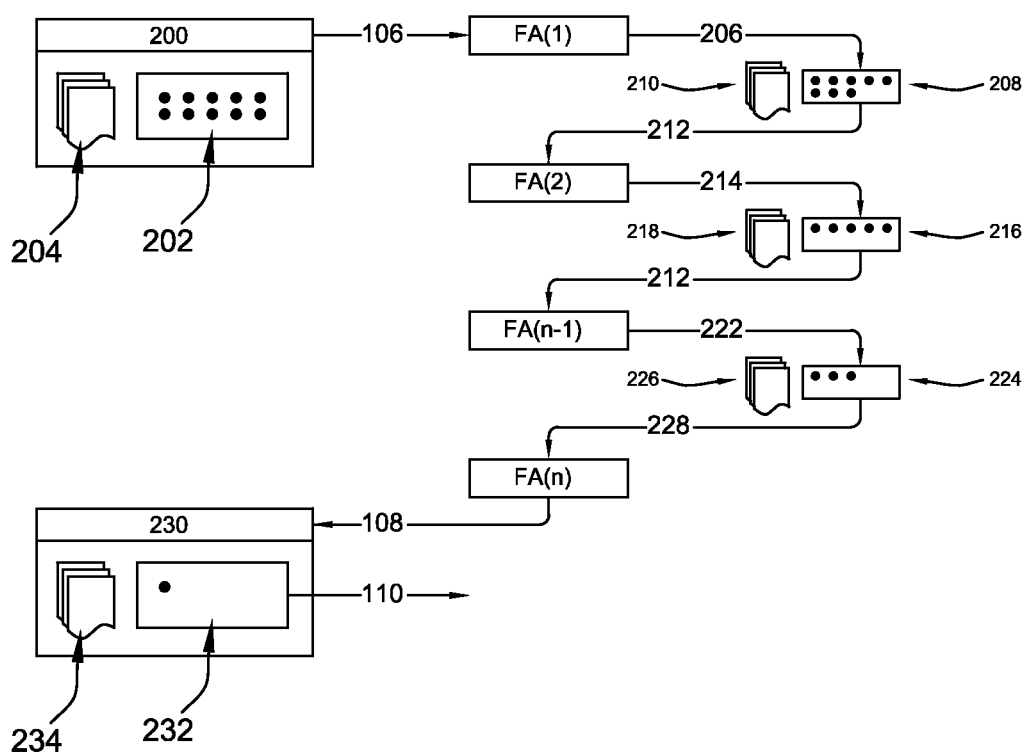
FIG. 3 illustrates a block diagram of a computer-implemented filter chain method or mechanism for resolving a DNS query in an embodiment.

A memory, digital storage device and/or non-transitory computer-readable medium of the database 16 and/or the DNS server 14 may have stored thereon the executable filter instructions, the one or more filtering computer programs, the one or more filtering algorithms and/or filter software (hereinafter "filtering instructions") that, when executed by the microprocessor of the DNS server 14, perform the one or more steps of the present method for improving DNS traffic routing via the system 10 as shown in FIGS. 2 and 3.

In embodiments, the first network 18 and/or the second network 24 (hereinafter collectively known as "networks 18, 24") may be, for example, a personal area network (PAN), a local area network (LAN), a campus area network (CAN), a Metropolitan area network (MAN), a wide area network (WAN) and/or the like. In an embodiment, the networks 18, 24 may be a wireless network, such as, for example, a wireless MAN, a wireless LAN, a wireless PAN, a Wi-Fi network, a WiMAX network, a global standard network, a personal communication system network, a pager-based service network, a general packet radio service, a universal mobile telephone service network, a radio access network and/or the like. In an embodiment, the networks 18, 24 may be a fixed network, such as, for example, an optical fiber network, an Ethernet, a cabled network, a permanent network, a power line communication network and/or the like. In another embodiment, the networks 18, 24 may be a temporary network, such as, for example, a modem network, a null modem network and/or the like. In yet another embodiment, the networks 18, 24 may be an intranet, extranet or the Internet which may also include the world wide web. The present disclosure should not be limited to a specific embodiment of the networks 18, 24.

FIGS. 2 and 3 illustrate computer-implemented methods that, when performed by the DNS server 14 and/or database 16, execute the filter chain mechanism, the filter instructions and/or the filter steps to determine, compute and/or identify one or more final answers to a DNS query from among a selection or collected of potential answers. For example, a DNS query requesting access to an internet-accessible resource may be generated by the client terminal 12 and/or may be transmitted to the DNS resolver 20 via transmission 100 as shown in FIG. 2. The internet-accessible resource may be identified by, for example, a Uniform Resource Locator (hereinafter "URL"), a similar identifier that includes a hostname, or a combination thereof. A hostname may be, for example, www.domain.com. A resource owner of the internet-accessible resource may control delegation of an entire domain such as domain.com, which may include one or more individual hostnames which may correspond to one or more specific internet-accessible resources.

In the present systems and methods, the resource owner may delegate at least one DNS nameserver or a plurality of DNS nameservers, each implementing the present filter method described herein, as "authoritative" for at least one domain or for one or more subdomains. For example, if a resource owner controls domain.com, the resource owner may delegate the DNS server 14 for implementing the present filter method as the authoritative source of service information for domain.com, or alternatively for sub.domain.com to delegate only a portion of the namespace.

The interface 22 may be utilized by the resource owner to configure service information to associate with DNS hostnames which may include information associated with hostnames in zone files using DNS resource records. In embodiments, the service information may comprise IP addresses, alternative canonical hostnames (hereinafter "CNAMEs"), mail servers, textual details, or service information associated with any RFC compliant DNS record type.

Further, the resource owner may, for a DNS resource record, associate and/or assign a collection of multiple potential answers to the DNS query for the DNS resource record via interface 22. Still further, the resource owner may, for the DNS resource record, associate and/or assign one or more configuration details about or regarding the collection of multiple potential answers. The one or more configuration details may comprise, but are not limited to; one or more statically configured details relevant to each potential answer and/or one or more dynamically determined details relevant to each potential answer. In embodiments, the one or more statically configured details may comprise at least one selected from geographic locations, priorities, weights, network related details, costs, metric watermarks, notes, application specific details, or similar information relevant to each potential answer. In embodiments, the dynamically determined details may comprise at least one selected from infrastructure metrics, such as, for example, up/down status, system loads, bandwidth usage, connection counts, request counts, performance metrics, or metrics relating to and/or associated with network connectivity between the terminal 12 and internet-accessible resources, such as, for example, latency, throughput, packet loss, jitter, application specific connectivity metrics, or other metrics relating to connectivity between application end users and service endpoints, which may be computed and/or measured by the resource owner or a third party service/system, and/or may be delivered to the system 10 via the interface 22. Moreover, the resource owner may configure, via the interface 22, a selection of pre-defined or built-in filter instructions to associate with, and/or to assign, to the DNS resource record.

The pre-defined or built-in filter instructions may be provided by the DNS server operator and/or may be selected, configured, and arranged by the resource owner independently for each individual DNS resource record as appropriate for the application serviced by the DNS resource record. In an embodiment, the selection of filter instructions for a DNS resource record may be empty. The pre-defined or built-in filter instructions, that may have been selected, configured, and arranged by the resource owner, may be stored with the configuration details for the DNS resource record in a memory location of the database 16 via the DNS server 14 or in a memory location accessible by the DNS server.

The terminal 12 may have requested access to an internet-accessible resource by initiating a DNS query to the DNS resolver 20 via a digital communication 100. The DNS resolver 20 determines the authoritative nameserver(s) that has been delegated by the resource owner of the requested domain resource (i.e., internet-accessible resource), and forwards the DNS query to the nameserver, such as, for example, the DNS server 14 via a digital communication 102 as shown in FIG. 2. The DNS server 14 identifies the internet-accessible resource associated with the DNS query and communicates with the database 16 via a digital communication 104 and extracts, from the database 16 via another digital communication 104, the configuration details associated with the requested DNS resource record, as configured by the resource owner using the interface 22.

The selection, configuration, and/or arrangement of the filter instructions in the extracted configuration details, as selected, configured and/or arranged by the resource owner using the interface 22, are used or utilized to initialize and/or execute the filter steps of the present method which may consist of one or more ordered sequences of the predefined filter instructions specified in the configuration details for the DNS resource record.

As shown in FIG. 3, the DNS server 14 may set, as input data 200 (hereinafter "input 200") to the present filter chain method, a selection or collection of potential answers 202 as specified in the extracted configuration details, along with any additional details about the answers as configured by the resource owner using the interface 22, and any relevant details 204 about the DNS query, including but not limited to, for example, the IP address of the requester, additional details as sent in the DNS query packet, and auxiliary details computed from the IP address of the terminal 12 and/or a request or the DNS packet such as geographic or network details about the terminal 12 and/or the requester. The input 200, which may include the collection of potential answers 202 along with additional details and/or any relevant details 204, is passed to the one or more predefined filter instructions via digital communication 106, whereby the one or more predefined filter instructions maybe have previously been selected, configured and/or arranged. As a result, the DNS server 14 may implement a first filter instructions FA(1) of a plurality of filter instructions FA(n) in the selected, configured and/or arranged filter chain instructions of the present filter chain method.

The first filter instructions FA(1) filters and/or manipulates data it receives as input 200 and/or may add, remove, rearrange, or otherwise filter and/or manipulate each of the answers in the collection of potential answers. The output 206 of the first filter instructions FA(1) is a new collection of potential answers 208 and additional details about the answers 210, which may contain answers and details from the input 200, new potential answers generated by the first filter instructions FA(1) according to a predefined filter instructions, or newly computed additional details about the collection of potential answers or new potential answers 208. One or more of the filter instructions may act on the input to sort or select answers according but not limited to weights or priorities, or based on statistical techniques or geographic computations, or according to network or infrastructure metrics or weightings, or using simple sorting and selection algorithms such as reversing, slicing, selecting one or more answers from the start or end of a list, randomized shuffling, consistent hashing, or other approaches as may be useful to arrange a list of potential answers according to an application's traffic management requirements.

The output of the first filter 208 is passed as second input 212 to the predefined filter instructions in the present filter chain method which may implement second filter instructions FA(2) in the present filter chain method, and the filter chain method may be repeated until subsequent filter instructions FA(n-1) and/or final filter instructions FA(n) is executed. The number of filter instructions repeated by the present filter chain method may be, for example, one or more filter instructions, at least four filter instructions, more than ten filter instructions or more than fifty filter instructions. The present disclosure should not be deemed as limited to a specific number of filter instructions that may be repeated during the execution of the present filter chain method.

The final output 230 of the final filter FA(n) of the present filter chain method may be a final answer or a collection of final answers 232, and/or additional details about the final answer and/or collection of final answers 234, which may be used by the DNS server 14 to compose a set of DNS resource records which may be compliant with the DNS RFC. The DNS server 14 may send and/or transmit the set of DNS resource records as the response to the DNS resolver 20 that forwarded the query via digital communication 110, and the DNS resolver 20 may send, transmit and/or forward the response to the client terminal 12. The terminal 12 may subsequently utilize the set of DNS resource records to access the requested resources.

A principle component of the present systems and methods is an architecture and/or engine for executing a linear sequence of one or more filter instructions that may have previously been selected, configured and/or arranged. The first filter instructions FA(1) may take in the input 200 and subsequently perform a specific filtration and/or manipulation on the input 200 to produce a first output 206. The filtration, manipulation and/or calculation achieved or executed by a first filter instructions FA(1) may be parameterized by certain aspects of the input 200, such as, for example, requester details, configuration details, metrics, DNS protocol details, network selections and metrics, geographic details, infrastructure metrics including connection counts, bandwidth usage, system loads, service up/down status, request counts, network connectivity metrics including latency, throughput, packet loss, jitter, and other similar metrics, configuration details, or requester details as may be applicable to selecting answers according to an application-specific traffic management algorithm. In embodiments, the outputs 206, 214, 222, 230 of the present filter chain method may follow conventions identical to, or substantially identical to, the inputs 200, 212, 220, 228 and/or may retain similar, substantially similar, or the same "format" as the inputs 200, 212, 220, 228, but the data included in the outputs 206, 214, 222, 230 may be newly generated, re-ordered, or otherwise filtered and/or manipulated with respect to the input provided to the present filter chain method, such that the outputs 206, 214, 222, 230 are substantially different than the inputs 200, 212, 220, 228. Crucially, because the outputs 206, 214, 222, 230 are in substantially the same "format" as the inputs 200, 212, 220, 228, outputs of FA(1) and other filter instructions may serve as inputs to subsequent filter instructions in the present filter chain method.

In embodiments, one or more filter instructions may examine the collection of potential answers to a DNS query, along with metrics associated with each answer, and remove answers from the collection of potential answers for which a particular or specific metric takes on a particular or specific value. For example, suppose each potential answer of the collection had an associated metric indicating if the answer is "enabled" or "disabled". The filter instructions may remove all answers from the collection having the metric value of "disabled". The output of these filter instructions would thus be the collection of answers in the input for which the metric value is "enabled".

In the architecture associated with the present systems and methods, a library of filter instructions may be provided as pre-defined and/or built-in codes implemented as part of the DNS server 14. The filter instructions may be made available for use in creating one or more filter instruction methods or chains. One or more new filter instructions may be added to the library of filter instructions as long as the one or more new filter instructions conform to the input and output requirements of the present filter chain method. The library of filter instructions may be stored at a memory located associated with, and/or accessible by, the DNS server 14. The library of filter instructions may comprise, for example, at least one filter instruction, four or more filter instructions, more that at least fifty filter instructions. The present disclosure should not be deemed as limited to a specific number of filter instructions provided in the library of filter instructions or algorithms.

A filter chain according to the present systems and methods may comprise a sequence of filter instructions with output from each filter instruction in the sequence passed as the input to one or more subsequent filter instructions in the sequence of the present filter chain method.

The filter chain method illustrated in FIG. 3 may comprise input configuration details associated with a DNS domain name and record type obtainable from a database, cache, or other data store, along with a collection of potential answers to a DNS query for the domain and record type, and/or other details such as metrics about each potential answer. From the input configuration details, a filter chain configuration may be obtainable and/or may contain a sequence of filter instructions to execute on the inputs along with other parameters for the filter instructions. For the filter instructions in the filter chain method, in sequence, code implementing the filter instructions may be instantiated based on input parameters, the input data structure may be passed into the one or more filter instructions; the filter instructions may act upon the input, filtering and/or manipulating the collection of potential answers, the new collection of potential answers, along with the remaining configuration details and metrics, may be composed into an input data structure to be provided to subsequent filter instructions in the sequence or method, and the filtering process may be repeated from for the next filter instructions in the sequence or method until the final filter instructions FA(n) has been executed and/or completed. From the final output of the final filter instructions FA(n) in the present filter chain method, the collection of a remaining or final answer or final answers may be extracted, may be composed into a DNS response, and/or may be returned as the output to the DNS resolver 20 and/or the terminal 12 from the DNS server 14.

FIG. 2 illustrates a full DNS query resolution process for a DNS record, when the DNS server 14 for the DNS record implements the present filter chain method. In embodiments, a user or system, for example, the terminal 12 may initiate a DNS query by communicating the DNS query via the first network 18, via an intermediary DNS systems (e.g., "recursors"), such as, for example, DNS resolver 20 to the DNS server 14. Request may be received by the DNS server 14, and the DNS server 14 may compile filter chain input by querying the database 16, cache, or other data store containing details of the filter chain method, such as, for example, the collection of potential answers, and other information pertaining to, or associated with, the requested DNS record. The DNS server 14 may execute the present filter chain method by passing the input, including the collection of potential answers, into the first filter instructions FA(1) in the chain. Filter chain method may be executed as described in FIG. 3, and the DNS server 14 may receive the final output (i.e., final answer or final answers) from the final filter instructions FA(n) in the filter chain and/or may comply the final output into a DNS response. The DNS response may be delivered by the DNS server 14 to the requester, intermediary DNS systems, user, and/or the terminal 12 wherein the service details in the selected DNS answers may be utilized to contact services, servers, and/or access the requested internet-accessible resource.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The invention claimed is:

1. A system for improving Domain Name System (DNS) traffic routing, the system comprises:
   a DNS resolver in digital communication with a microprocessor of an authoritative DNS server via a digital communication network, wherein the authoritative DNS server is configured to make DNS traffic routing decisions, wherein a DNS query, associated with a requested DNS resource record, is transmitted to the authoritative DNS server via the digital communication network;
   at least one database in digital communication with, and accessible by, the authoritative DNS server, wherein the authoritative DNS server identifies the requested DNS resource record associated with the DNS query and extracts, from the at least one database, one or more configuration details associated with the requested DNS resource record, wherein the one or more configuration details associated with the requested DNS resource record comprise
   an input collection of potential answers to the DNS query,
   at least one filter chain instruction and
   at least one selected from one or more statically configured details relevant to each potential answer and one or more dynamically determined details relevant to each potential answer,
   wherein the microprocessor of the authoritative DNS server filters the input collection of potential answers by executing and utilizing the at least one filter chain instruction to extract a final output from the input collection of potential answers, wherein the final output comprises at least one final answer to the DNS query selected from the input collection of potential answers by the microprocessor executing and utilizing the at least one filter chain instruction, wherein at least one final answer is composed into a DNS response to the DNS query dynamically resolved by the microprocessor executing and utilizing the at least one filter chain instruction and the DNS response is at least returnable as output to the DNS resolver, and
   further wherein the at least one filter chain instruction comprises a linear sequence of filter chain instructions selected, configured, assigned and/or arranged from a library of filter chain instructions provided as predefined and/or built-in codes implemented as part of the authoritative DNS server.

2. The system according to claim 1, wherein the one or more statically configured details comprises at least one selected from information relevant to each potential answer comprising at least one selected from one or more priorities, one or more weights, one or more network related details, one or more costs, metric watermarks, notes and application specific details.

3. The system according to claim 1, wherein the one or more dynamically determined details comprises at least one selected from one or more infrastructure metrics comprising at least one selected from an up/down status, one or more system loads, one or more bandwidth usages, one or more connection counts, one or more request counts and one or more performance metrics.

4. The system according to claim 1 wherein the one or more dynamically determined details comprises one or more metrics relating to or associated with network connectivity between a client terminal and the requested internet-accessible resource identified by a DNS resource record, wherein the one or more metrics comprise latency, throughput, packet loss, and/or jitter.

5. The system according to claim 1, further comprising:
   a user interface in digital communication with the authoritative DNS server, wherein at least one selected from (i) the configurations details associated with the requested DNS resource record are configured via the user interface, (ii) at least one selected from the at least one filter chain instruction are assigned and associated with the DNS resource record via the user interface, and (iii) at least one selected from the at least one filter chain instruction are selected, configured, assigned and arranged from the library of filter chain instructions via the user interface.

6. The system according to claim 1, further comprising:
   a client terminal in digital communication with at least one selected from the DNS resolver and the authoritative DNS server.

7. A computer-implemented method for improving Domain Name System (DNS) traffic routing, the method comprising:
   receiving, by a microprocessor of an authoritative DNS server, a DNS query, associated with a requested DNS resource record, via a digital communication network, wherein the authoritative DNS server makes DNS traffic routing decisions;
   identifying, by the microprocessor of the authoritative DNS server, the requested DNS resource record associated with the DNS query;
   extracting, from at least one database or memory accessible by the microprocessor of the authoritative DNS server, one or more configuration details associated with the requested DNS resource record, wherein the one or more configuration details associated with the requested DNS resource record comprise an input collection of potential answers to the DNS query, at least one filter chain instruction and at least one selected from one or more statically configured details relevant to each potential answer and one or more dynamically determined details relevant to each potential answer, wherein the at least one filter chain instruction comprises a linear sequence of filter chain instructions selected, configured, assigned and/or arranged from a library of filter chain instructions provided as pre-defined and/or built-in codes implemented as part of the authoritative DNS server;

filtering, by the microprocessor of the authoritative DNS server, the input collection of potential answers by executing the at least one filter chain instruction to extract a final output from the input collection of potential answers, wherein the final output comprises at least one final answer to the DNS query dynamically resolved by the microprocessor and selected from the input collection of potential answers by the microprocessor utilizing the at least one filter chain instruction;

composing the at least one final answer into a DNS response to the DNS query by the microprocessor of the authoritative DNS server; and returning the DNS response as output.

8. The method according to claim 7, wherein the at least one filter chain instruction is pre-defined filter chain instructions provided by an DNS server operator of the authoritative DNS server.

9. The method according to claim 7, wherein the at least one filter chain instruction is pre-defined filter instructions selected, configured, assigned and/or arranged from the library of filter chain instructions by a resource owner via a user interface in digital communication with the authoritative DNS server.

10. The method according to claim 7, wherein the one or more statically configured details comprises at least one selected from information relevant to each potential answer comprising at least one selected from one or more priorities, one or more weights, one or more network related details, one or more costs, metric watermarks, notes and application specific details.

11. The method according to claim 7, wherein the one or more dynamically determined details comprises at least one selected from one or more infrastructure metrics comprising at least one selected from one or more system loads, one or more bandwidth usage, and one or more performance metrics.

12. The method according to claim 7, wherein the one or more dynamically determined details comprises metrics relating to, or associated with, network connectivity between a client terminal and the requested internet-accessible resource identified by a DNS resource record, wherein the metrics comprise latency, throughput, packet loss, and/or jitter.

13. The method according to claim 7, further comprising:
delivering metrics to the authoritative DNS server via a user interface in digital communication with the authoritative DNS server, wherein the metrics are computed and/or measured by a resource owner or a third party.

14. A non-transitory computer-readable medium with filter chain instructions stored thereon, that when executed by a microprocessor of an authoritative Domain Name System (DNS) server, perform a method for improving DNS traffic routing, the method comprising:

identifying, by the microprocessor, a requested DNS resource record associated a DNS query received by the microprocessor;

extracting, from at least one database or memory accessible by the microprocessor, one or more configuration details associated with the requested DNS resource record, wherein the one or more configuration details associated with the requested DNS resource record comprise an input collection of potential answers to the DNS query, at least one filter chain instruction and at least one selected from one or more statically configured details relevant to each potential answer and one or more dynamically determined details relevant to each potential answer, wherein the at least one filter chain instruction comprises a linear sequence of filter chain instructions selected, configured, assigned and/or arranged from a library of filter chain instructions provided as pre-defined and/or built-in codes implemented as a part of the authoritative DNS server;

filtering, by the microprocessor, the input collection of potential answers by executing and utilizing the at least one filter chain instruction to extract a final output from the input collection of potential answers, wherein the final output comprises at least one final answer to the DNS query dynamically resolved by the microprocessor executing and utilizing the at least one filter chain instruction;

composing the at least one final answer into a DNS response to the DNS query by the microprocessor; and returning the DNS response as output.

15. The non-transitory computer-readable medium according to claim 14, wherein the authoritative DNS server makes DNS traffic routing decisions.

16. The non-transitory computer-readable medium according to claim 14, further comprising:
transmitting the DNS query from a DNS resolver to the microprocessor.

17. The non-transitory computer-readable medium according to claim 14, further comprising:
storing a plurality of DNS resource records in the at least one database or the memory accessible by the microprocessor; and
selecting, configuring, assigning and/or arranging the at least one filter chain instruction independently for each individual DNS resource record of the plurality of DNS resource records.

* * * * *